(12) United States Patent
Haemmerle

(10) Patent No.: US 10,508,673 B2
(45) Date of Patent: Dec. 17, 2019

(54) SECURING DEVICE FOR A FURNITURE FITTING

(71) Applicant: Julius Blum GmbH, Hoechst (AT)

(72) Inventor: Kurt Haemmerle, Lustenau (AT)

(73) Assignee: JULIUS BLUM GMBH, Hoechst (AT)

( * ) Notice: Subject to any disclaimer, the term of this patent is extended or adjusted under 35 U.S.C. 154(b) by 280 days.

(21) Appl. No.: 14/843,206

(22) Filed: Sep. 2, 2015

(65) Prior Publication Data

US 2015/0377269 A1 Dec. 31, 2015

Related U.S. Application Data

(63) Continuation of application No. PCT/AT2014/000047, filed on Mar. 12, 2014.

(30) Foreign Application Priority Data

Mar. 13, 2013 (AT) .................... A 193/2013

(51) Int. Cl.
*F16B 12/14* (2006.01)
*A47B 88/483* (2017.01)
(Continued)

(52) U.S. Cl.
CPC ............ *F16B 12/14* (2013.01); *A47B 88/463* (2017.01); *A47B 88/467* (2017.01);
(Continued)

(58) Field of Classification Search
CPC ...... F16B 12/14; F16B 35/041; A47B 88/467; A47B 88/463; A47B 88/483; A47B 51/00;
(Continued)

(56) References Cited

U.S. PATENT DOCUMENTS 1,868,415 A * 7/1932 Gundersen ............. B23G 9/001
29/416
2,946,039 A * 7/1960 Grunwald ................ H01R 4/34
411/531
(Continued)

FOREIGN PATENT DOCUMENTS

AT 503 661 12/2007
CN 1580597 2/2005
(Continued)

OTHER PUBLICATIONS

International Search Report dated Jul. 21, 2014 in corresponding International Application No. PCT/AT2014/000047 (with English translation).

(Continued)

*Primary Examiner* — Nkeisha Smith
(74) *Attorney, Agent, or Firm* — Wenderoth, Lind & Ponack, L.L.P.

(57) ABSTRACT

A securing device for securing a furniture fitting to a piece of furniture is provided. The furniture fitting can be selectively secured to the piece of furniture by a left furniture fitting face or a right furniture fitting face using the securing device. The securing device includes a connecting element having two connecting element regions for securing the furniture fitting to the piece of furniture, and a securing body with a through-opening. The connecting element is at least partly in the through-opening and can be moved relative to the securing body, the connecting element having at least one stop element which can be moved to a limited degree relative to the connecting element.

20 Claims, 17 Drawing Sheets

(51) Int. Cl.
| | | |
|---|---|---|
| | *A47B 88/463* | (2017.01) |
| | *A47B 88/467* | (2017.01) |
| | *E05F 1/00* | (2006.01) |
| | *E05F 5/06* | (2006.01) |
| | *E05F 1/10* | (2006.01) |

(52) U.S. Cl.
CPC .............. *A47B 88/483* (2017.01); *E05F 1/00* (2013.01); *E05F 5/06* (2013.01); *E05F 1/1058* (2013.01); *E05Y 2600/632* (2013.01); *E05Y 2800/174* (2013.01); *E05Y 2900/20* (2013.01)

(58) Field of Classification Search
CPC .. E05F 1/00; E05F 5/06; E05F 1/1058; E05Y 2600/632; E05Y 2800/174; E05Y 2900/20; E05Y 2800/29; E04D 5/02; E04D 7/02
See application file for complete search history.

(56) References Cited

U.S. PATENT DOCUMENTS

| | | | | |
|---|---|---|---|---|
| 3,862,458 | A * | 1/1975 | Stanaitis | B21H 3/06 |
| | | | | 470/12 |
| 3,951,558 | A * | 4/1976 | Komarov | F16B 12/14 |
| | | | | 312/263 |
| 3,999,245 | A | 12/1976 | Bue et al. | |
| 4,462,730 | A * | 7/1984 | Knohl | F16B 41/002 |
| | | | | 411/371.1 |
| 4,786,201 | A * | 11/1988 | Huetter | F16B 12/14 |
| | | | | 403/22 |
| 5,308,285 | A * | 5/1994 | Malen | B21H 3/02 |
| | | | | 411/368 |
| 6,457,922 | B1 * | 10/2002 | Tsai | F16B 13/0858 |
| | | | | 411/55 |
| 6,923,305 | B2 | 8/2005 | Dulancy et al. | |
| 7,707,687 | B2 * | 5/2010 | Giovannetti | E05D 3/14 |
| | | | | 16/289 |
| 8,807,670 | B2 * | 8/2014 | Blum | E05F 1/1276 |
| | | | | 16/286 |
| 9,140,289 | B2 * | 9/2015 | Sutterluetti | E05D 5/02 |
| 9,464,473 | B2 * | 10/2016 | Baldreich | E05F 1/1058 |
| 9,500,015 | B2 * | 11/2016 | Omann | E05C 19/165 |
| 2005/0264144 | A1 * | 12/2005 | Verbeek | E05D 15/46 |
| | | | | 312/323 |
| 2007/0053766 | A1 * | 3/2007 | Lin | E06B 3/9636 |
| | | | | 411/389 |
| 2007/0177959 | A1 * | 8/2007 | Chopp | H01R 4/64 |
| | | | | 411/389 |
| 2013/0232769 | A1 * | 9/2013 | Wooten | F16B 25/0031 |
| | | | | 29/525.11 |
| 2014/0169912 | A1 * | 6/2014 | Sutterluetti | E05D 5/02 |
| | | | | 411/389 |
| 2015/0157377 | A1 * | 6/2015 | Pham | A61B 17/7055 |
| | | | | 606/279 |
| 2017/0204645 | A1 * | 7/2017 | Lubetz | E05F 1/1058 |
| 2017/0265644 | A1 * | 9/2017 | Fischer | A47B 88/467 |

FOREIGN PATENT DOCUMENTS

| | | |
|---|---|---|
| CN | 2844538 | * 12/2006 |
| DE | 3641290 | 5/1988 |
| DE | 20 2010 014 948 | 3/2012 |
| GB | 2 427 646 | 1/2007 |
| SU | 733522 | 5/1980 |
| WO | 2013/029070 | 3/2013 |

OTHER PUBLICATIONS

Austrian Search Report dated Nov. 13, 2013 in corresponding Application No. A 193/2013 (with English translation).
Chinese Search Report dated May 16, 2016 in corresponding Chinese Application No. 201480023503.9.

* cited by examiner

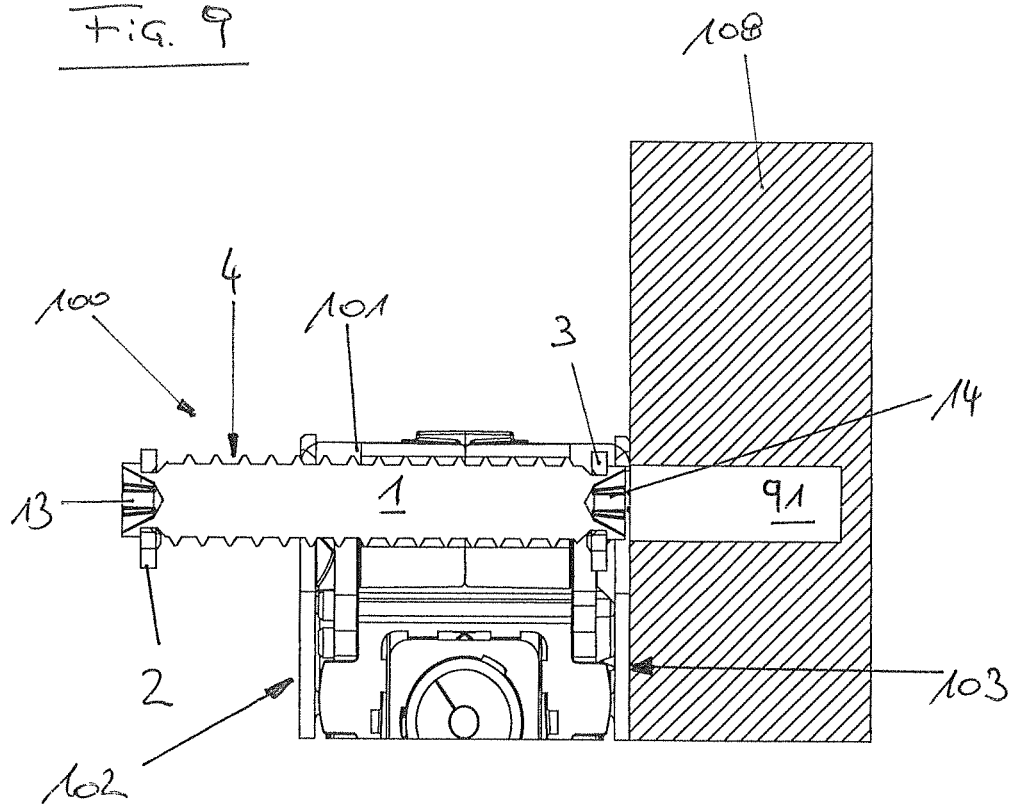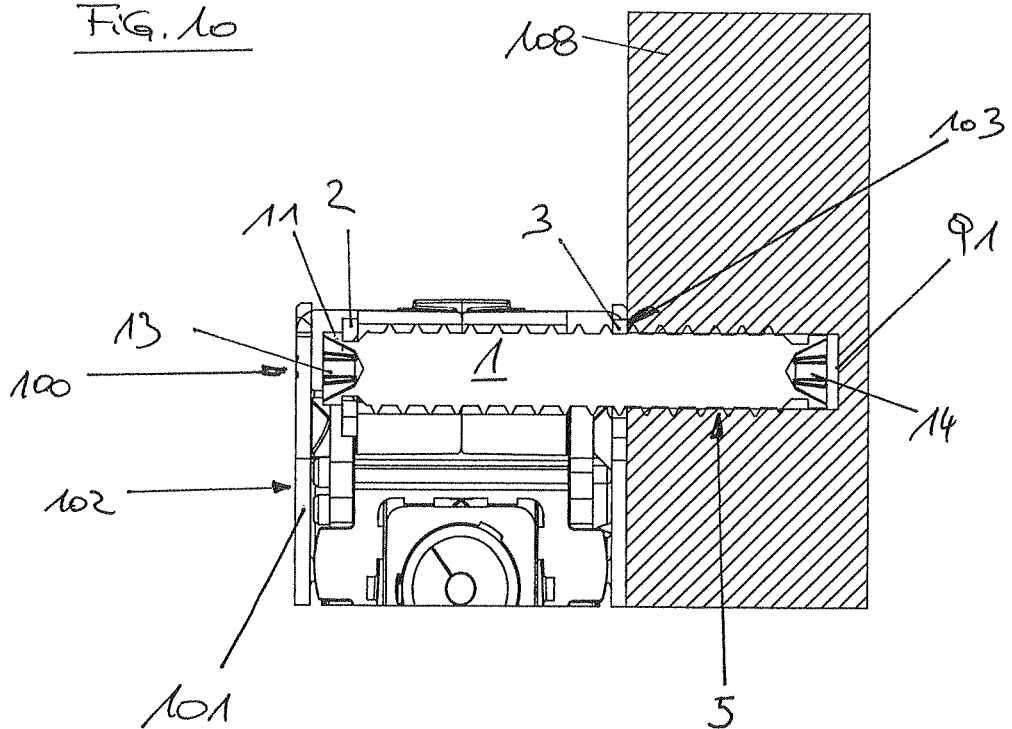

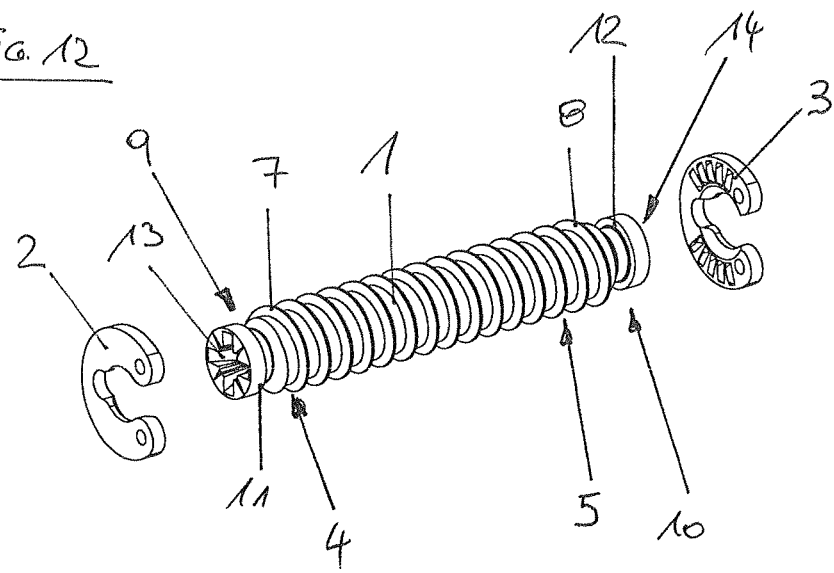
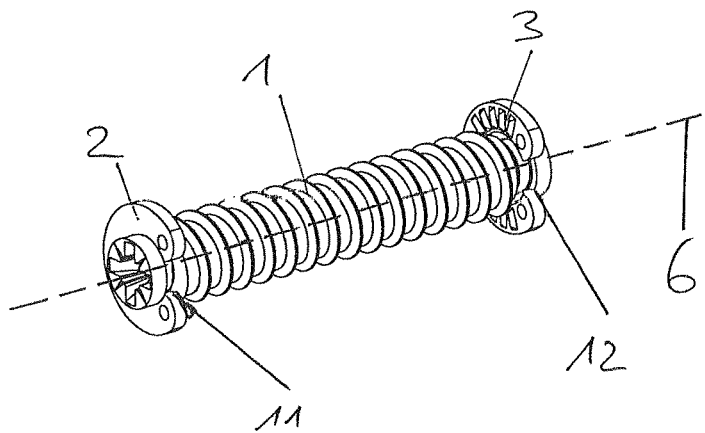
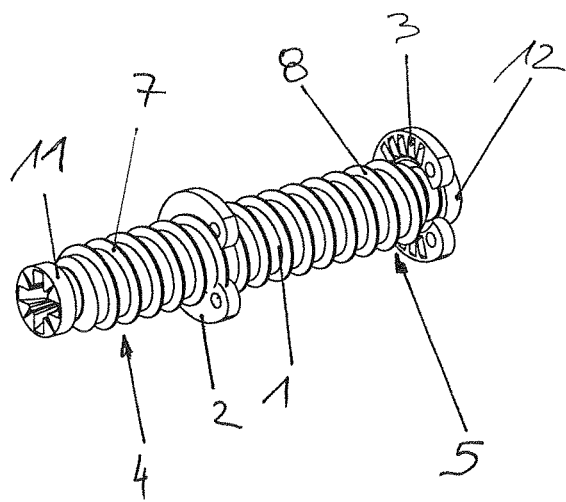

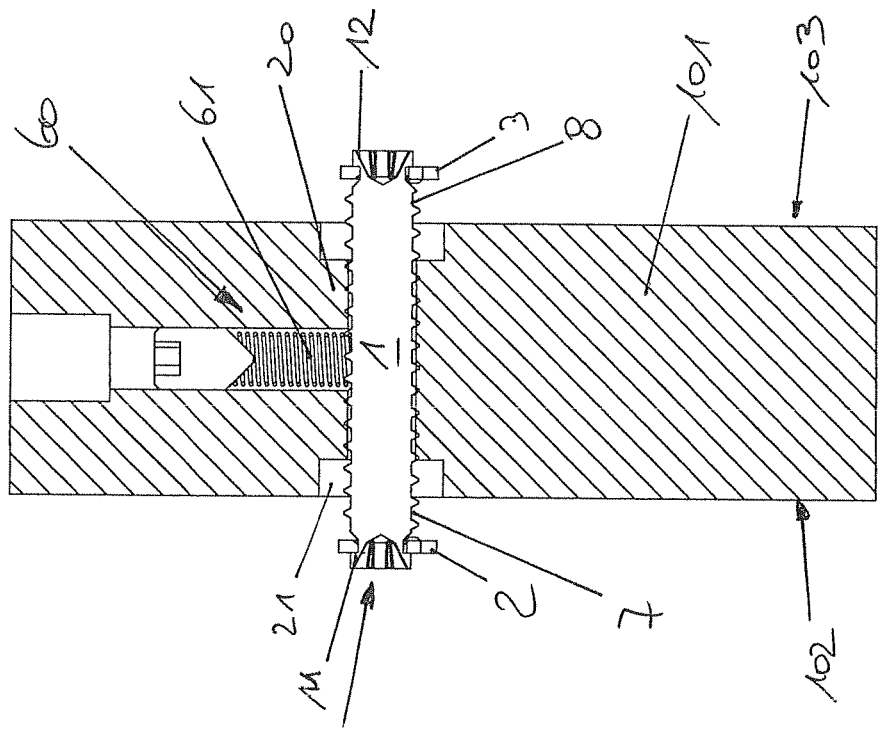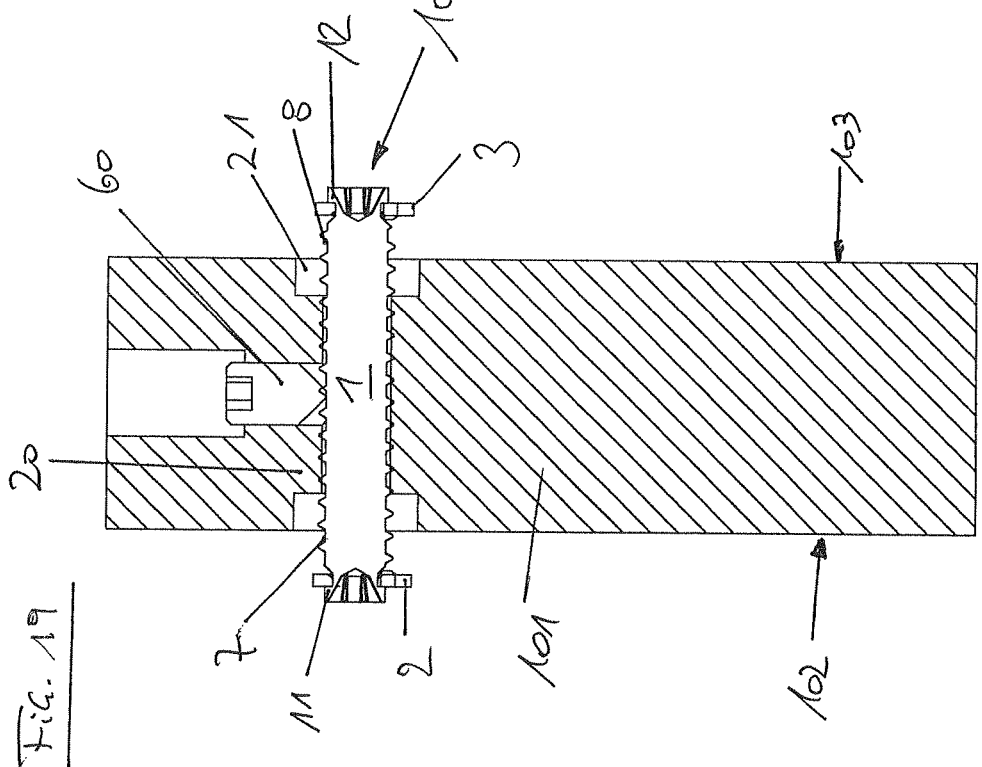

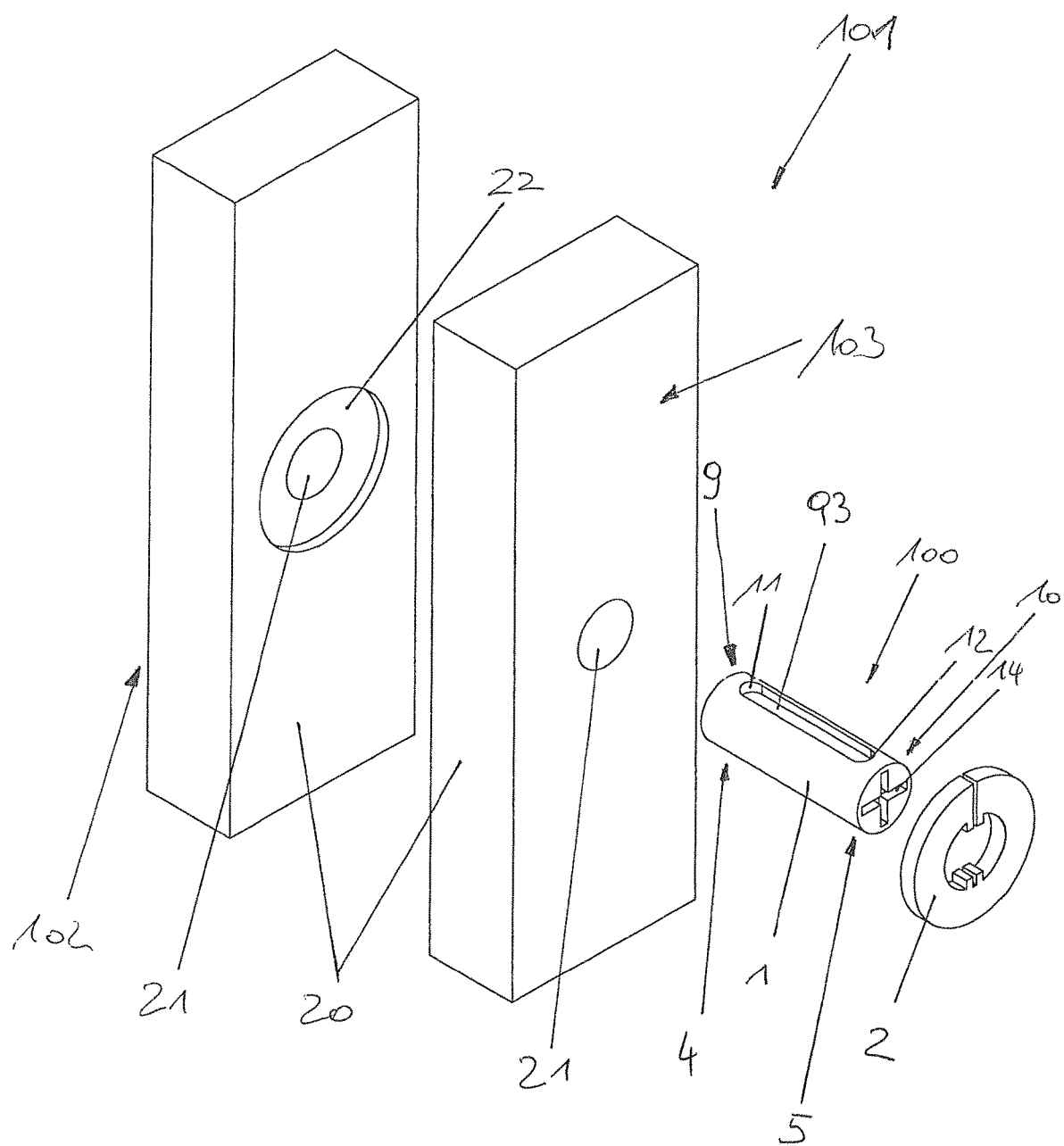

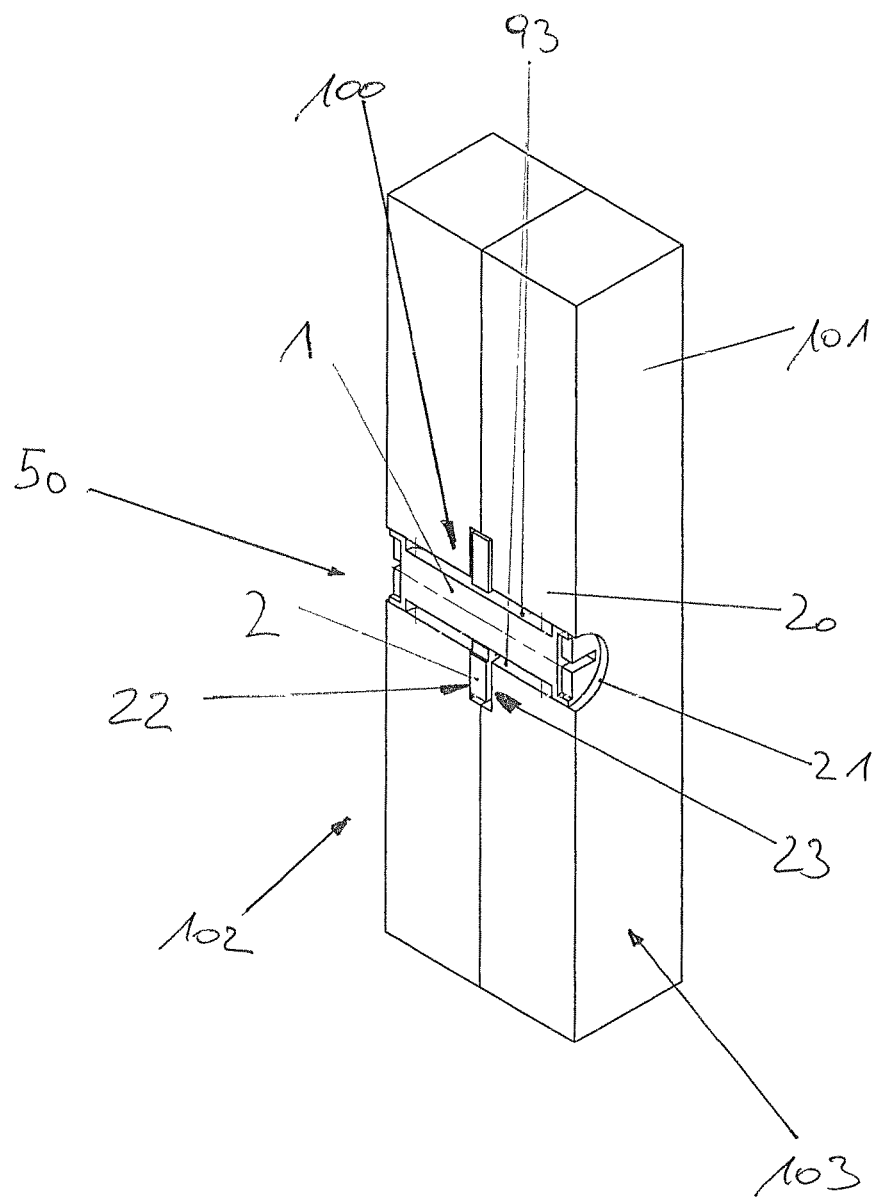

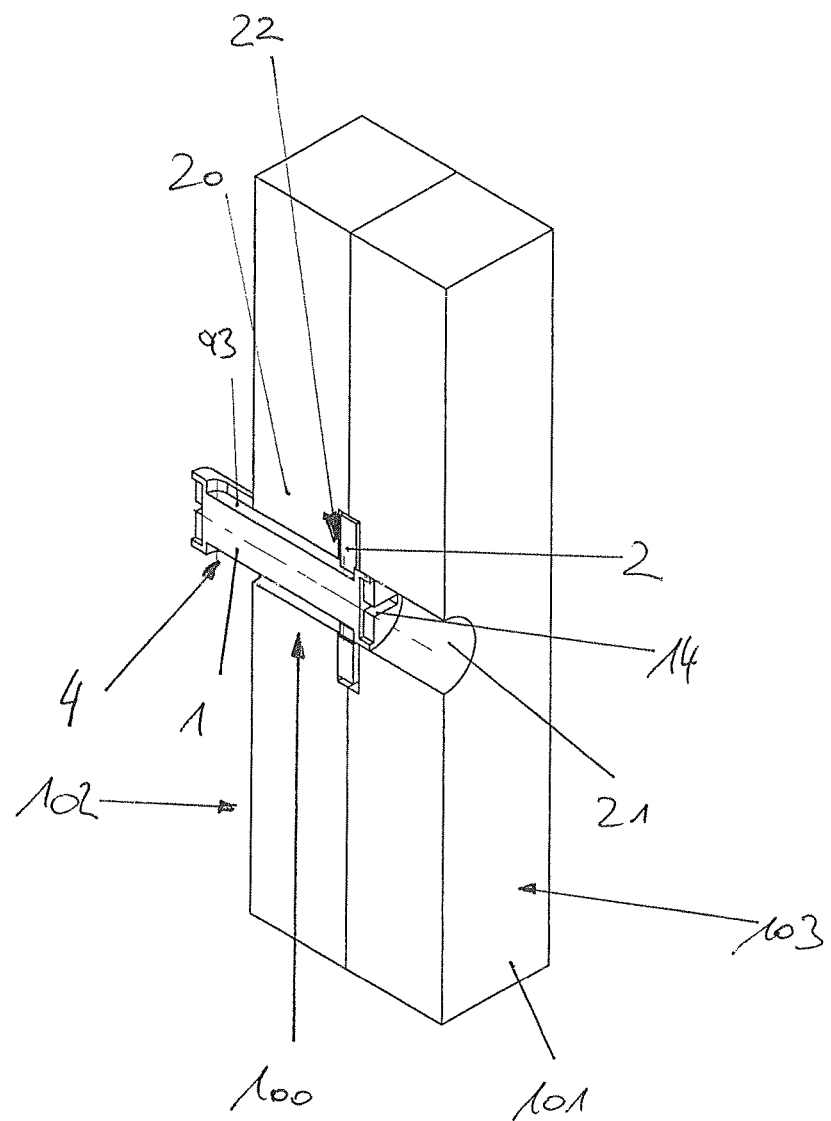

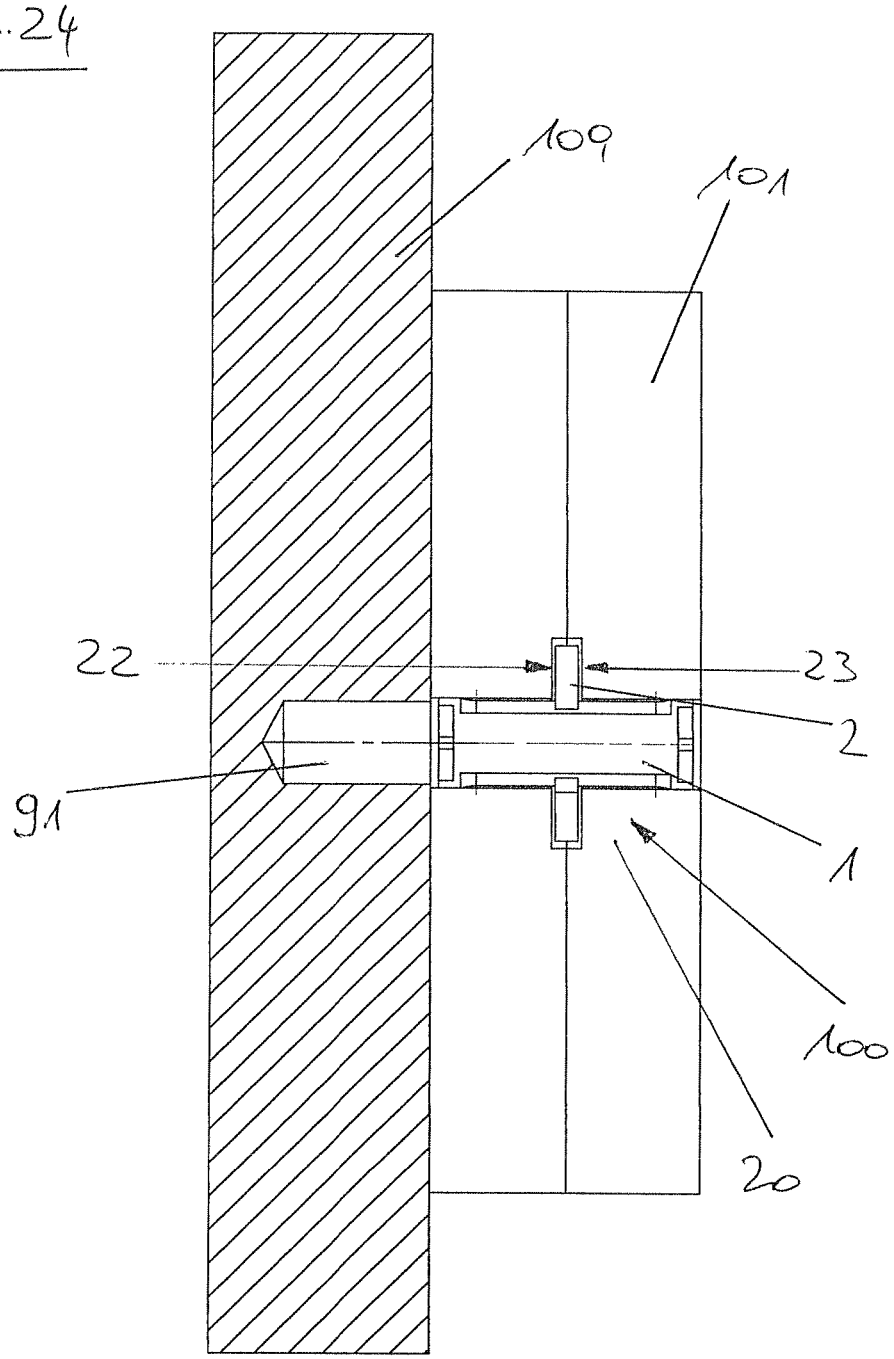

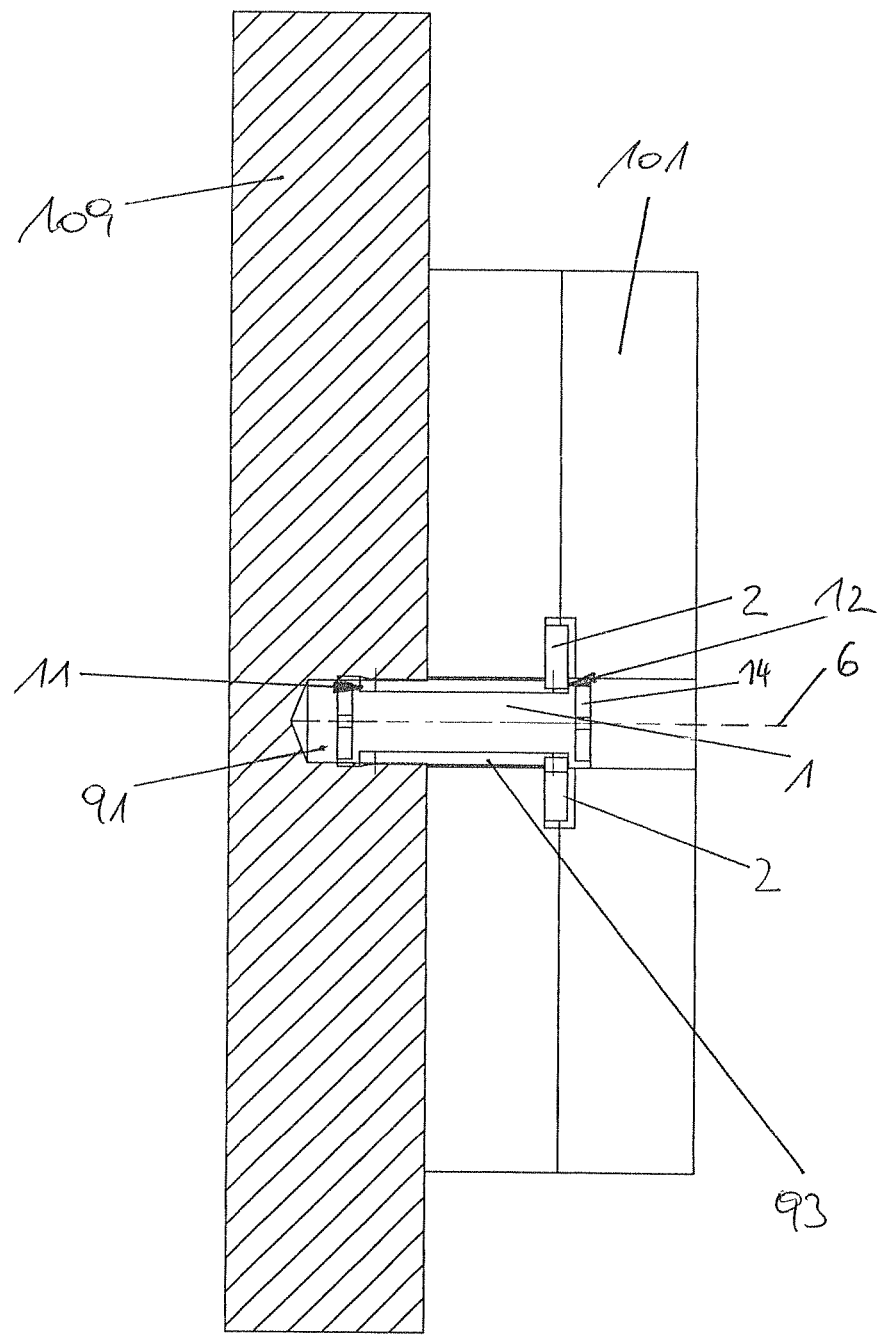

SECURING DEVICE FOR A FURNITURE FITTING

BACKGROUND OF THE INVENTION

1. Field of the Invention

The invention concerns a securing device for securing a furniture fitting to a piece of furniture.

The invention further concerns a furniture fitting for a piece of furniture with such a securing device and a piece of furniture with such a furniture fitting.

2. Description of the Related Art

Such a securing device is shown, for example, in DE 20 2010 014 948 U1. A furniture fitting—which here is in the form of an actuating drive for a furniture flap—is secured to a furniture carcass by means of that securing device. In that respect, the actuating drive is of such a configuration that it can be secured both to the left-hand side of the furniture carcass and also to the right-hand side thereof and thus both assembly positions can be implemented with one design configuration for the actuating drive.

For that purpose, the securing device has a through opening from one side of the actuating drive to the other. A connecting element is placed in that through opening and the actuating drive is secured to the respective side of the furniture carcass by means of that connecting element.

SUMMARY OF THE INVENTION

An object of the invention is to provide a securing device for securing a furniture fitting to a piece of furniture, that is improved over the state of the art.

The fact that the connecting element has at least one abutment element which is limitedly moveable relative to the connecting element means that the abutment element can serve in two different positions—relative to the connecting element—as an abutment with which the securing device and thus the furniture fitting can be secured to the piece of furniture.

That provides for an extremely compact securing device in which the furniture fitting can be secured to the piece of furniture in positionally secured relationship by virtue of the configuration of the abutment element. In addition, the limited mobility of the abutment element relative to the connecting element ensures that the abutment element can remain on the connecting element and this therefore leads to a preferred assembly mode as the abutment element and the connecting element are not separated from each other.

Further advantageous embodiments of the invention are defined in the appendant claims.

It has proven to be advantageous if the at least one abutment element projects radially from the connecting element.

In that respect, it has proven to be particularly advantageous if the connecting element has a longitudinal axis and the at least one abutment element is limitedly moveable along the longitudinal axis of the connecting element.

Particularly preferably, it is provided in that respect that the at least one abutment element can be releasably secured to the connecting element.

It has proven to be particularly advantageous if the connecting element and the securing body are jointly in the form of a pre-assembled structural unit. It is possible in that way to provide that the connecting element cannot come away from the securing body of its own accord and it is thus possible to ensure that the connecting element is not lost.

According to a preferred embodiment, it can be provided that the connecting element extends substantially completely through the through opening in the securing body.

It can further preferably be provided that the connecting element in the assembly condition is received on one side sunk in the through opening of the securing body and on the other side in the piece of furniture. It is thus possible to achieve an aesthetically attractive securing device in the assembly condition, as the fact that the connecting element is sunk in the securing device means that the connecting element does not project laterally beyond the securing device.

In a preferred embodiment, it can be provided that the connecting element regions can be connected to the piece of furniture in force-locking and/or positively locking relationship.

It has further proven to be advantageous if the two connecting element regions are of a symmetrical configuration relative to each other on the connecting element.

It has further been found to be advantageous if a connecting element region in the assembly position projects beyond the left-hand or the right-hand furniture fitting side. By virtue of the fact that the connecting element region projects beyond the furniture fitting sides, the connecting element can penetrate into a furniture carcass and can be secured therein.

It can further be preferably provided that the connecting element regions of the connecting element have a thread. Securing can be effected in a simple fashion by the use of a thread.

It is particularly preferably provided in that respect that the at least one abutment element is supported moveably in the thread.

In that respect, it has proven to be advantageous if the at least one abutment element is in the form of a retaining ring.

In a preferred embodiment, it can be provided that the connecting element has two abutments which are fixed with respect to the connecting element for the at least one abutment element.

In that respect, it is preferably provided that the at least one abutment element is respectively limitedly moveable between one of the abutments which are fixed with respect to the connecting element on one side and the furniture fitting side serving as the abutment on the other side.

It is particularly preferred, however, if the securing device has two abutment elements.

It has further proven to be advantageous if the connecting element has two ends, wherein provided in the region of the two ends of the connecting element are abutments which are fixed with respect to the connecting element for the at least one abutment element.

In a preferred embodiment, it can be provided that two separate tool receiving means are provided on the connecting element. By virtue of the provision of two independent tool receiving means, each can be used individually for mounting at a furniture fitting side.

Desirably, the tool receiving means are in the form of a slot or cross slot or hexagonal socket or hexalobular socket.

A furniture fitting for a piece of furniture having at least one securing device for securing the furniture fitting to the piece of furniture in accordance with at least one of the described embodiments is also disclosed.

In an embodiment of the invention, the securing body is provided substantially completely in the furniture fitting. The provision of the securing body in the furniture fitting means that the furniture fitting can be prefabricated in the form of a complete assembly and there is no need for an additional assembly operation when mounting the furniture fitting to the piece of furniture.

In accordance with a preferred embodiment, it can be provided that the furniture fitting is in the form of an ejection device, a drive device, a retraction device or a damping device for a moveable furniture part or an actuating drive for a furniture flap or a rail extension guide or a lighting device.

A piece of furniture having such a furniture fitting and such a securing device in accordance with at least one of the described embodiments is also disclosed.

BRIEF DESCRIPTION OF THE DRAWINGS

Further details and advantages of the invention will be described more fully hereinafter by means of the specific description with reference to the embodiments by way of example illustrated in the drawings in which:

FIG. 9 shows a sectional view of a furniture fitting with a securing device prior to mounting to a furniture sidewall, FIG. 10 shows a sectional view of FIG. 9 after mounting to a right-hand sidewall has been effected, FIG. 12 shows a perspective view of a connecting element with two released abutment elements, FIG. 13 shows a perspective view of the connecting element with mounted abutment elements, FIG. 14 shows a perspective view of a connecting element with a limitedly moveable abutment element, FIG. 19 shows a section through a furniture fitting and its securing device with a positioning device for the connecting element, FIG. 20 shows a variant of a positioning device for a connecting element in a sectional view in a furniture fitting, FIG. 21 shows an exploded view of a variant of a securing device with only one abutment element, FIG. 22 shows a perspective sectional view through the securing device of FIG. 21, FIG. 23 shows a sectional view as in FIG. 22 with a connecting element displaced towards the left, FIG. 24 shows a sectional view through a securing device of a furniture fitting prior to mounting to a furniture carcass sidewall, and FIG. 25 shows a sectional view through a securing device of a furniture fitting after mounting to a furniture carcass sidewall.

DETAILED DESCRIPTION OF THE INVENTION

Figure 1:
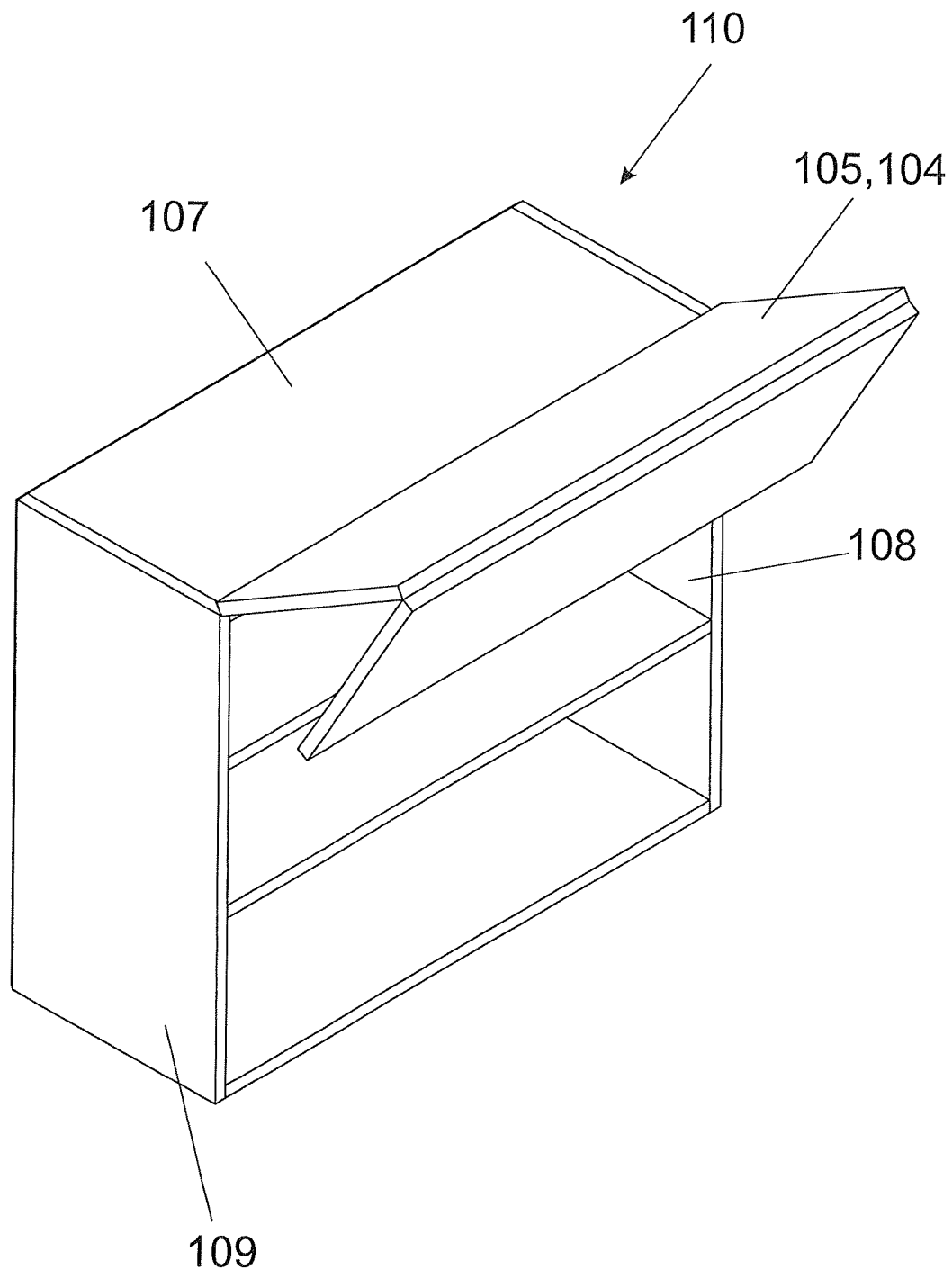
FIG. 1 shows a perspective view of a piece of furniture with a furniture flap.

FIG. 1 shows a perspective view of a piece of furniture 110. That piece of furniture 110 has a furniture carcass 107 and a moveable furniture part 104 in the form of a furniture flap 105. The furniture carcass 107 further has a right-hand furniture carcass side 108 and a left-hand furniture carcass side 109.

Figure 2:
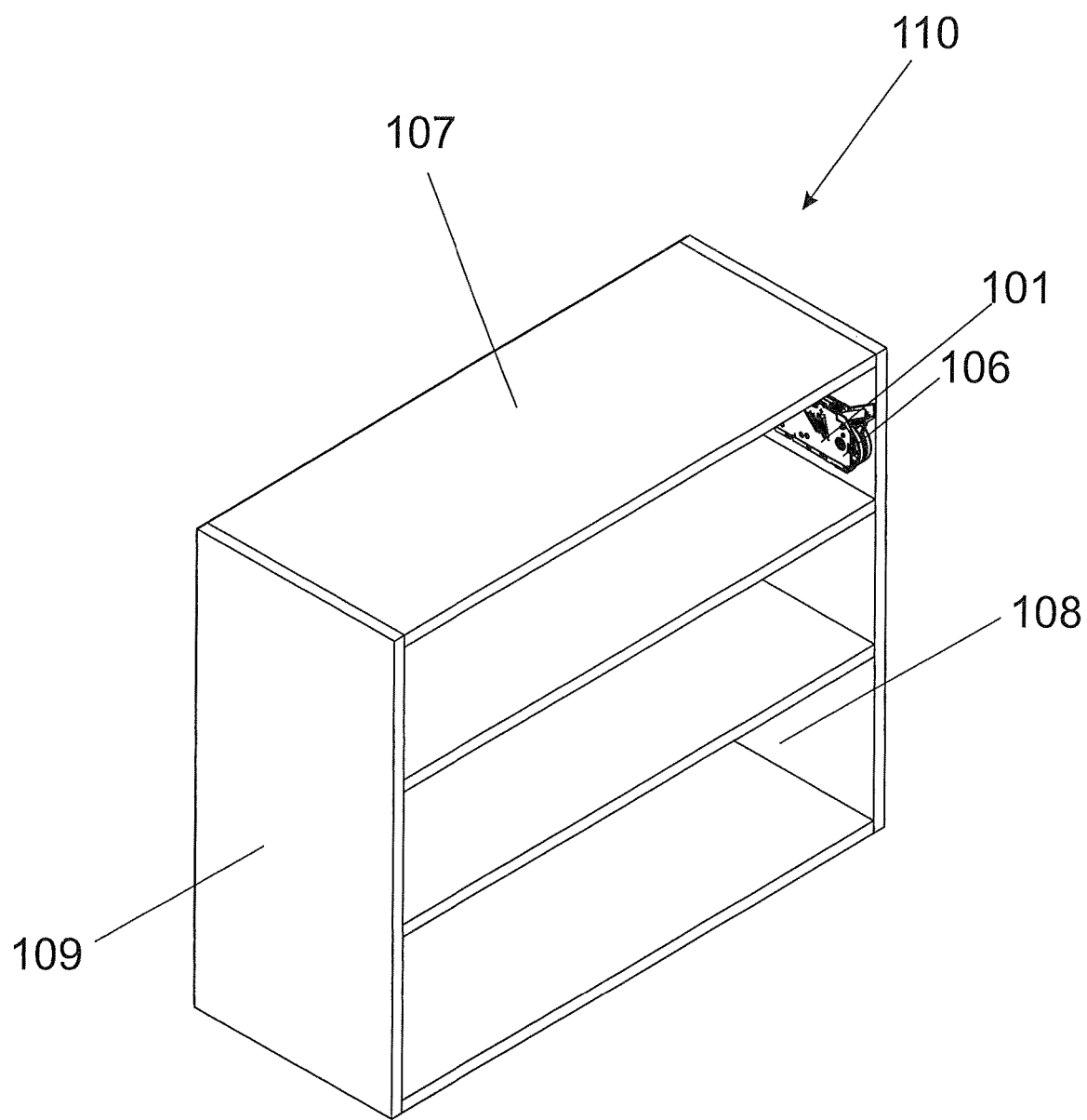
FIG. 2 shows a perspective view of a piece of furniture with the furniture flap removed.

As shown in FIG. 2 the furniture fitting 101 is secured to those furniture carcass sides 108 and 109 by means of a securing device 100 (not shown here). In this embodiment, the furniture fitting 101 is in the form of an actuating drive 106 for the furniture flap 105 (not shown here) (see in that respect FIG. 1).

A further furniture fitting 101 is secured on the opposite left-hand furniture carcass side 109 (this is not visible in this view). In order not to have to produce two different design configurations for furniture fittings 101 for fitting to the left-hand and right-hand furniture carcass sides 108 and 109 respectively, those furniture fittings 101 are symmetrical, that is to say, one and the same furniture fitting 101 can be secured both on the left-hand furniture carcass side 109 and also on the right-hand furniture carcass side 108. In this and also in the following figures, mention is respectively made of a furniture fitting 101 secured to a left-hand furniture carcass sidewall 109 or a right-hand furniture carcass sidewall 108 of a piece of furniture 110. It will be self-evident that naturally it is also possible to envisage furniture fittings 101 which are not fixed on the left-hand or right-hand furniture carcass sidewall 109 and 108 respectively, but at another side of the piece of furniture 110—like, for example, the bottom or the top of the furniture carcass 107 or on one of the shelves disposed in the furniture carcass 107, or also on a moveable furniture part (like a furniture flap), a drawer or the like. The only important consideration in that respect is that the furniture fitting 101 is a unit of symmetrical configuration, which makes it possible for the furniture fitting 101 itself to be arranged at two different furniture fitting sides (like for example a left-hand furniture fitting side 102 and a right-hand furniture fitting side 103) at a side of the piece of furniture 110 (see FIGS. 10 and 11).

Figure 3:
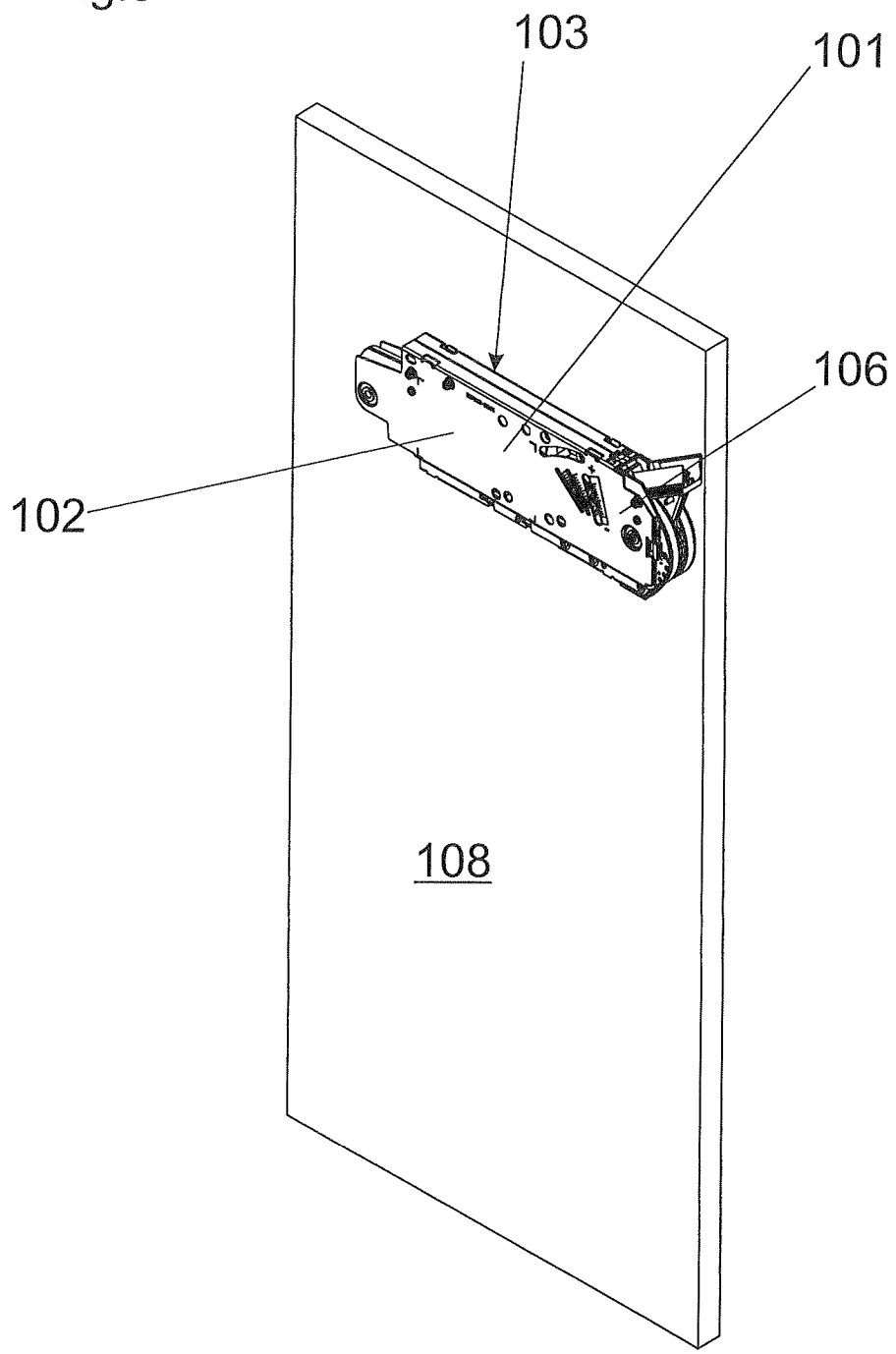
FIG. 3 shows a perspective view of a sidewall of a furniture carcass of a piece of furniture with furniture fitting mounted thereon.

FIG. 3 shows the right-hand furniture carcass side 108 at which the furniture fitting 101 was secured in the upper region with its right-hand furniture fitting side 103 to the right-hand furniture carcass side 108. In this preferred embodiment, this furniture fitting 101 is in the form of an actuating drive 106 for a furniture flap 105 (not shown here). The furniture fitting 101 could equally well have been in the form of an ejection device, a drive device, a retraction device or, for example, a damping device for a moveable furniture part or also a drawer rail extension guide or a lighting device.

That furniture fitting 101 could equally have been fixed with its left-hand furniture fitting side 102 on a left-hand furniture carcass side 109 (not shown here)—by virtue of the symmetrical configuration of the furniture fitting 101.

Figure 4:
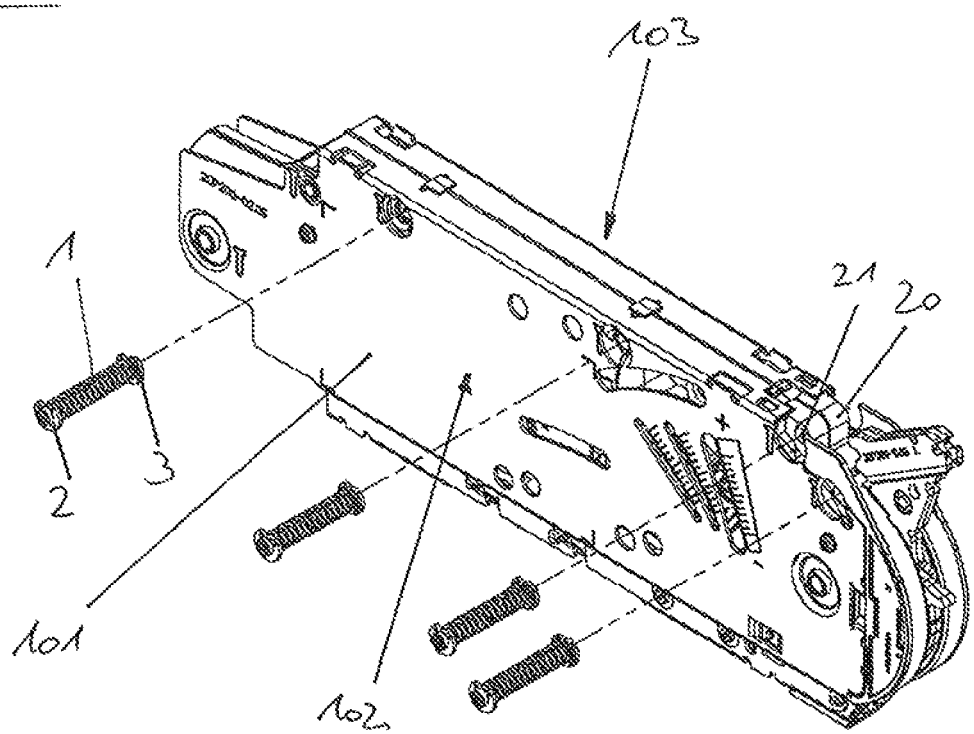
FIG. 4 shows a perspective view of a furniture fitting with four securing devices before their connecting elements were fitted in the securing body.
Figure 5:
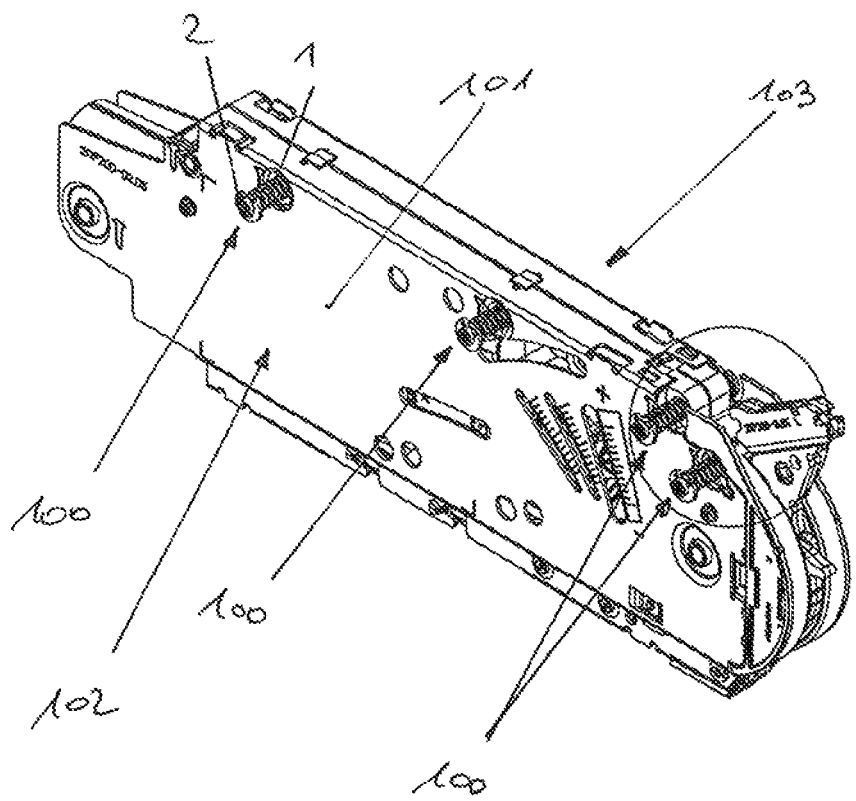
FIG. 5 shows a perspective view of FIG. 4 with mounted connecting elements.

FIGS. 4 and 5 show a perspective view of a furniture fitting 101 with four securing devices 100, FIG. 4 showing that the connecting elements 1 have not yet been fitted with their abutment elements 2 and 3 into the furniture fitting 101. That therefore represents the condition prior to delivery of the furniture fitting 101 as the intention is to deliver that unit in one piece in order to ensure that a connecting element 1 or its abutment elements 2 and 3 could not become lost prior to mounting. That also represents the great advantage over the use of simple screws which hitherto fitters have also happily used in order to secure such furniture fittings to articles of furniture.

In this preferred embodiment, the furniture fitting 101 is in the form of an actuating drive 106 and has four securing devices 100. The securing devices 100 substantially comprise a securing body 20 which is provided in the interior of the furniture fitting 101 and which has a through opening 21 through the furniture fitting 101, extending from a left-hand furniture fitting side 102 to the right-hand furniture fitting side 103.

Figure 6:
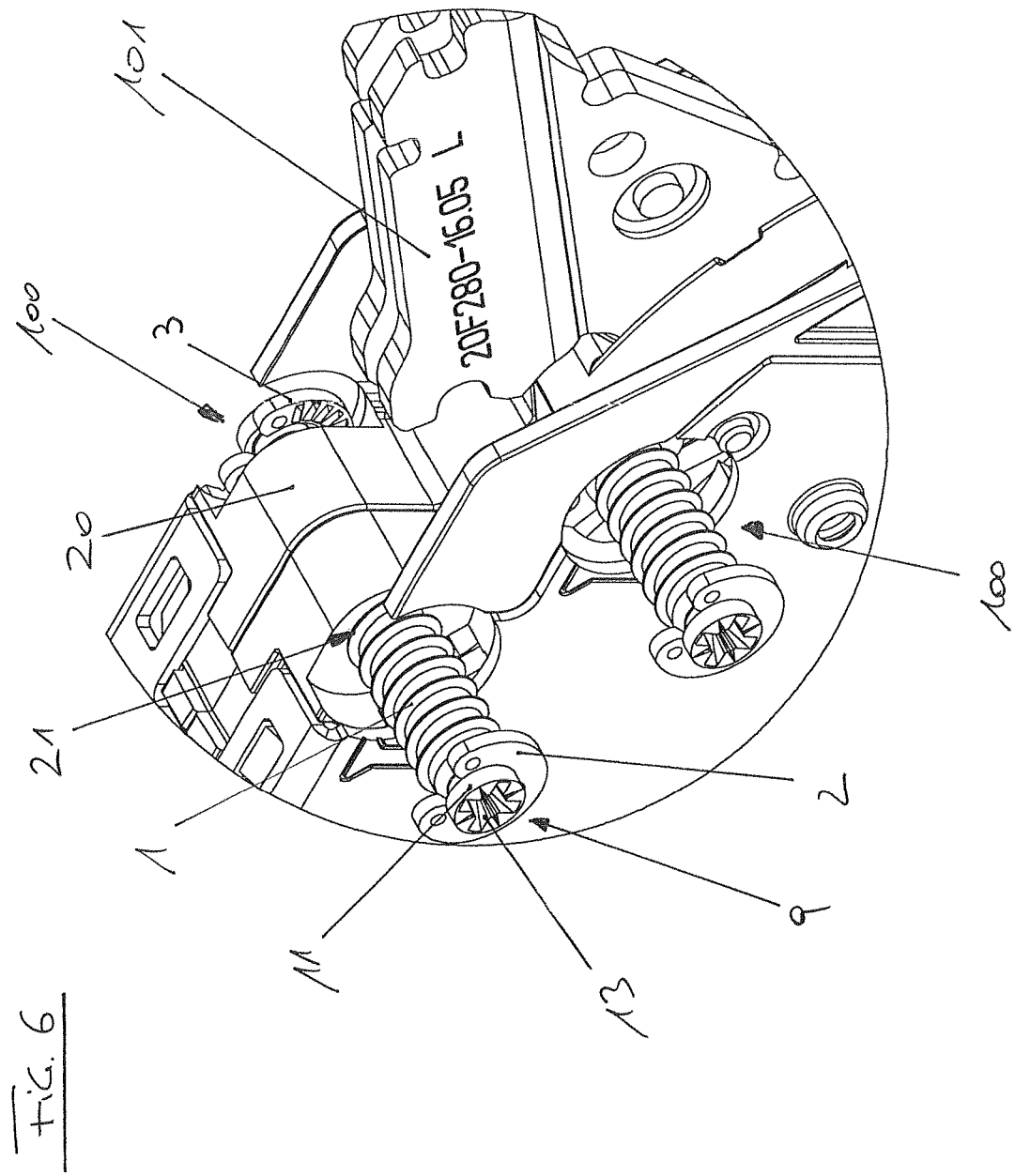
FIG. 6 shows a detail view of FIG. 5.

FIG. 6 shows a detail view of FIG. 5, illustrating the two front securing devices 100 in the installed condition. So that the connecting element 1 cannot drop out of the furniture fitting 101, the two abutment elements 2 and 3 are mounted at both ends 9 and 10 of the connecting element 1. In this preferred embodiment, these involve retaining rings. The retaining rings are limitedly moveable in the thread of the connecting element 1. In other words, they can move along the thread. So that the abutment elements 2 and 3 cannot come loose from the connecting element 1 of their own accord, provided on the connecting element 1 in the region of the ends 9 and 10 are the abutments 11 and 12 which are fixed with respect to the connecting element and against which the abutment elements 2 and 3 can bear. The abutments which are fixed with respect to the connecting element preferably have abutment surfaces oriented substantially perpendicularly to the longitudinal axis of the connecting element. That gives an abutment or holding effect like a positively locking relationship in the axial direction. As soon as one of the abutment elements 2 or 3 bears against the abutment 11 or 12 which is fixed with respect to the connecting element, they cooperate like a connecting element head with which the furniture fitting 101 can be secured to a piece of furniture (not shown here), that is to say in this case braced thereto. In this embodiment, a suitable tool is introduced into the tool receiving means 13 and thus the connecting element 1 can be rotated together with the abutment element 2 or 3 respectively.

FIGS. 7 and 8 again show the same furniture fitting 101 as in the preceding Figures, this time with a sectional view in relation to one of the securing devices 100. It can be clearly seen from the detail view in FIG. 8 that on one side the securing body 20 of the furniture fitting 101 is disposed substantially completely within the furniture fitting 101 and the connecting element 1 extends substantially completely through the through opening 21 in the securing body 20. In this case, the securing device 100 is in the form of a pre-assembled structural unit 50 whereby none of the parts of the securing device 100—like, for example, the connecting element 1 or the abutment elements 2 and 3—can be separated from the furniture fitting 101 during, for example, transportation thereof, and thus it is possible to avoid losing one of those parts.

Figure 7:
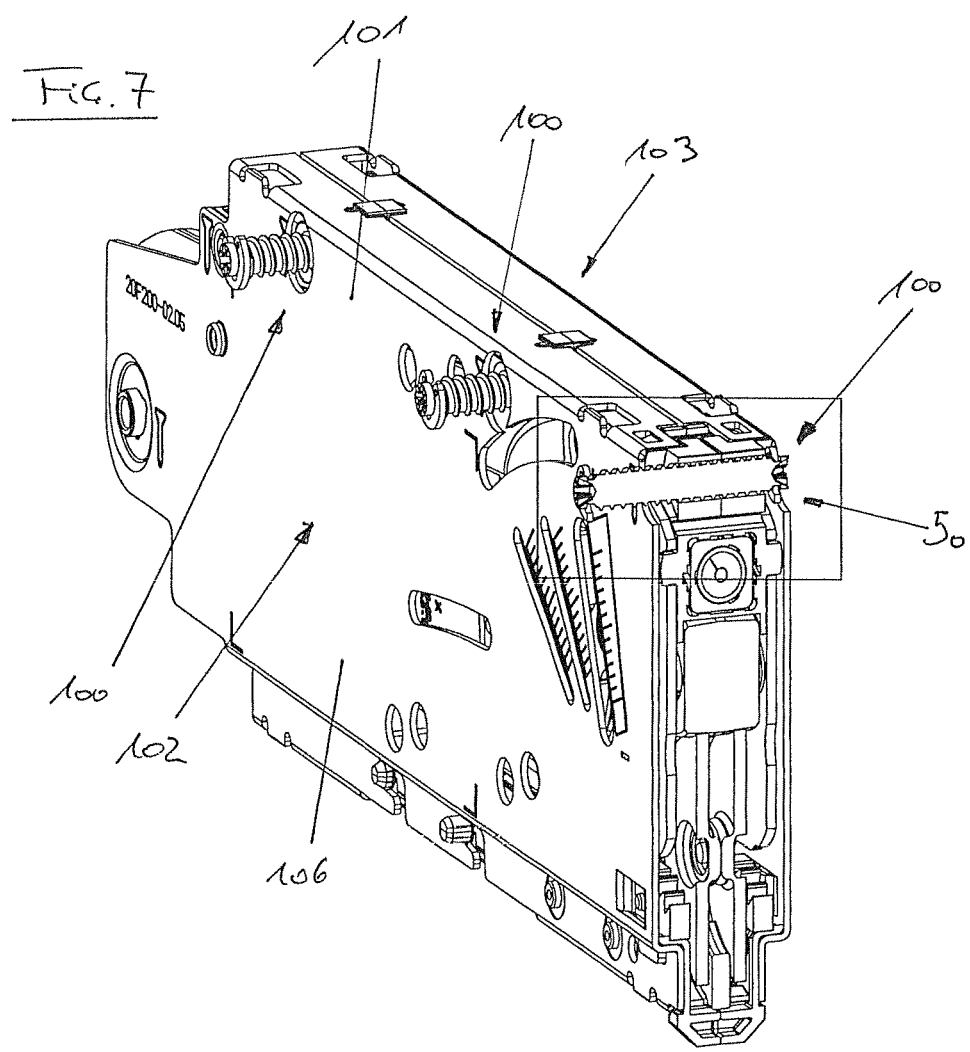
FIG. 7 shows a perspective view with a section in the case of a securing device of the furniture fitting.
Figure 8:
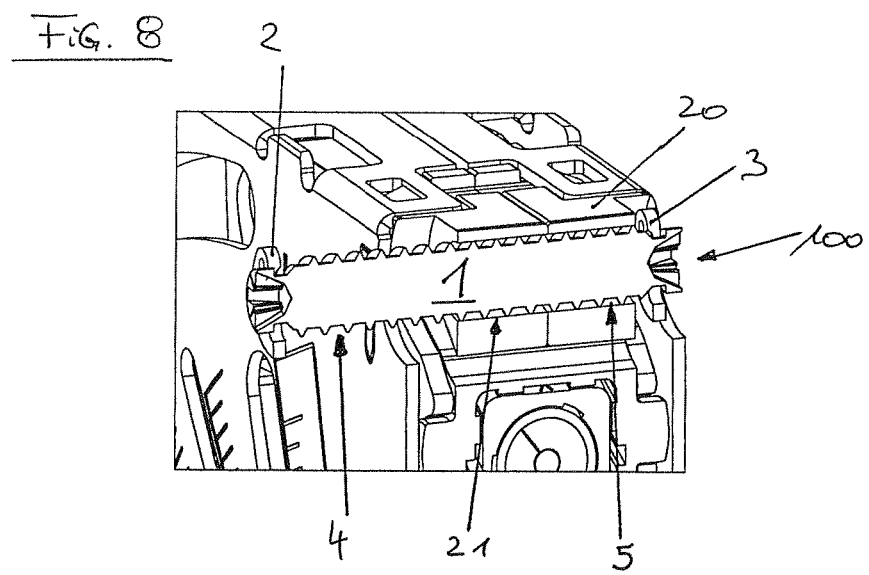
FIG. 8 shows a detail view of FIG. 7.

It can be clearly seen specifically from the view in FIGS. 7 and 8 that the furniture fitting 101 can be secured with the securing device 100 selectively with a left-hand furniture fitting side 102 or a right-hand furniture fitting side 103 to a piece of furniture 110 (not shown here), the securing device 101 having a connecting element 1, wherein the connecting element 1 has two connecting element regions 4 and 5 for securing the furniture fitting 101 to the piece of furniture 110 and the securing device 100 has a securing body 20 with a through opening 21. In this arrangement, the connecting element 1 is arranged at least partially in the through opening 21 and the connecting element 1 is moveable relative to the securing body 20, the connecting element 1 having two abutment elements 2 and 3 limitedly moveable relative to the connecting element 1.

Figure 11:
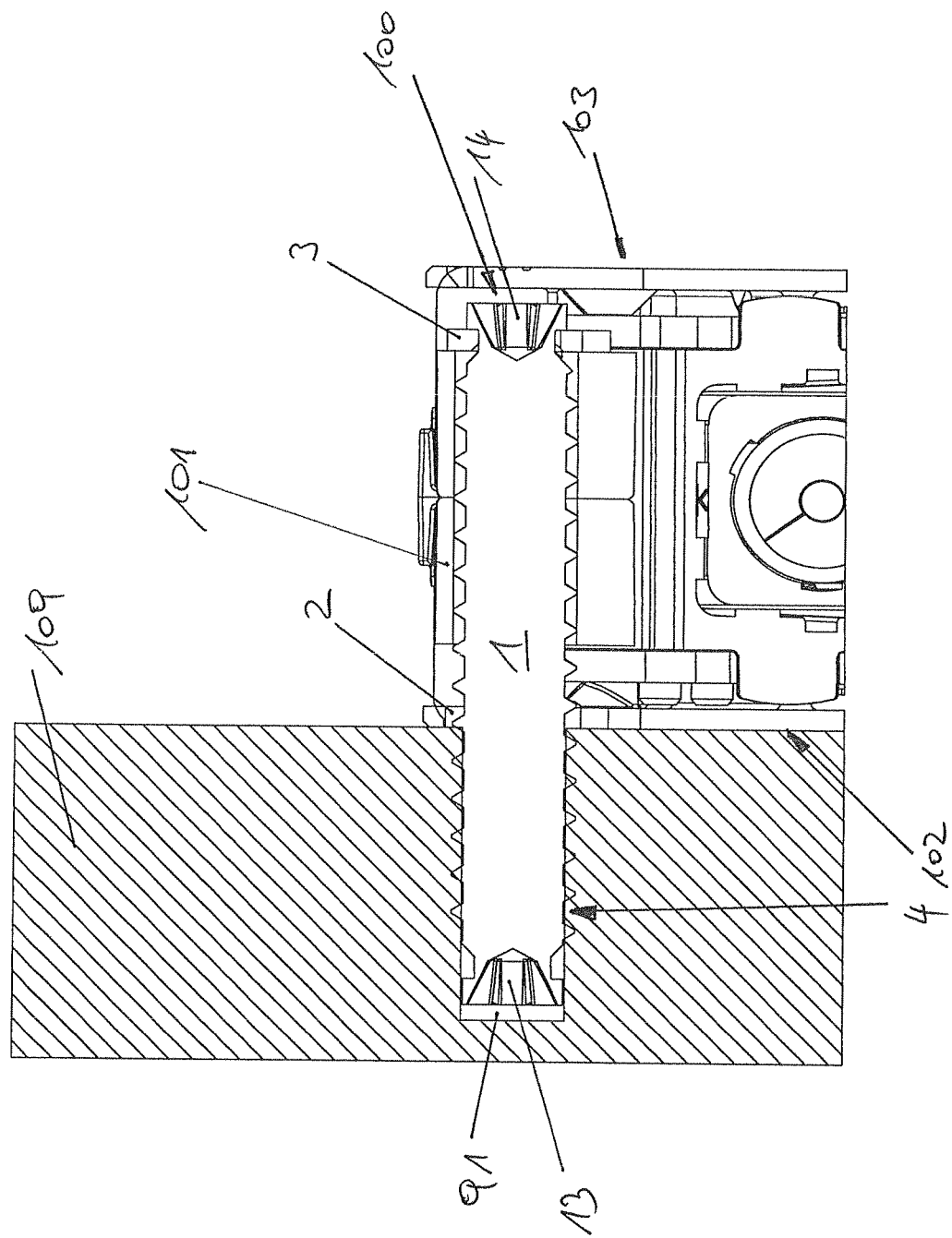
FIG. 11 shows a sectional view through a securing device of a furniture fitting after mounting to a left-hand sidewall.

FIGS. 9 through 11 now show how the furniture fitting 101 can be secured by way of its securing device 100 on the one hand to a right-hand furniture carcass side 108 (FIG. 10) and on the other hand to a left-hand furniture carcass side 109 (FIG. 11).

For that purpose—as shown in FIG. 9—the furniture fitting 101 is applied to the right-hand furniture carcass side 108 so that the connecting element 1 is disposed over the bore 91 in the right-hand furniture carcass side 108. A suitable tool is then fitted into the tool receiving means 13 of the connecting element 1 and the connecting element 1 in this preferred embodiment is screwed into the bore 91 in the right-hand furniture carcass side 108 until the connecting element region 5 of the connecting element 1 is disposed in the bore 91 in the right-hand furniture carcass side 108 (FIG. 10). So that a stable connection is produced between the furniture fitting 101 and the furniture carcass side 108, the abutment element 2 cooperates with the abutment 11 of the connecting element 1, being fixed with respect thereto, like a screw head which presses the furniture fitting 101 against the right-hand furniture carcass side 108. During the operation of screwing the connecting element 1 into the right-hand furniture carcass side 8, the second abutment element 11 travels along the connecting element 1 in the direction of the center thereof and bears against the right-hand furniture carcass side 108.

It can be clearly seen from this view that, in the mounted condition, the connecting element 1 is received on one side sunk in the through opening 21 in the securing body 20 and on the other side in the furniture fitting 101. It can further be seen from these views in FIGS. 10 and 11 that a respective connecting element region 4 or 5, in the mounted position, projects beyond the left-hand furniture fitting side 102 and the right-hand furniture fitting side 103 of the furniture fitting 101.

So that mounting can also be effected on the left-hand furniture carcass side 109, the connecting element 1 has two separate tool receiving means 13 and 14. On one side for mounting to the right-hand furniture carcass side 108 (tool receiving means 13) and on the other side on the left-hand furniture carcass side 109 (tool receiving means 14).

After mounting is effected, the connecting element 1 completely disappears together with the abutment elements 2 and 3 in the furniture fitting 101, which contributes to an aesthetic and narrow configuration for the furniture fitting 101.

Securing the furniture fitting 101 to the left-hand furniture carcass side 109 is effected similarly as was described in relation to the description of FIG. 10.

FIG. 12 shows an exploded view of the connecting element 1 and its two abutment elements 2 and 3 which—as can be clearly seen here—are in the form of retaining rings.

In this arrangement, the connecting element 1 has the two ends 9 and 10, in the region of which are provided abutments 11 and 12 which are fixed with respect to the connecting element and with which the two abutment elements 2 and 3 can be prevented from being able to come loose from the connecting element 1. When the abutment elements 2 and 3 are disposed at those abutments 11 and 12, the abutment elements 2 and 3 cooperate with the abutments 11 and 12 like a connecting element head (see FIG. 13).

In this preferred embodiment, the tool receiving means 13 and 14 are in the form of cross-slot receiving means. It will be appreciated that this would not have to be the case. It could equally well be envisaged that the tool receiving means 13 and 14 are each in the form of a slot, a hexagonal socket or a hexalobular socket or also any other conceivable tool receiving means.

As can be seen from FIG. 14, the abutment elements 2 and 3 are mounted moveably in the thread 7 and 8, respectively, and can move limitedly in those threads 7 and 8 until they bear against the abutments 11 and 12 which are fixed with respect to the connecting element.

In this embodiment, the threads 7 and 8 involve a continuous thread. That would not have to be the case as a thread 7 and 8 per se is required only at the connecting element regions 4 and 5 to secure the furniture fitting 101 (not shown) to the piece of furniture. In this embodiment, the two connecting element regions 4 and 5 are of a symmetrical configuration with each other on the connecting element 1 and the abutment elements 2 and 3 can be releasably secured to the connecting element 1. This entails advantages in terms of production technology, but would not actually have to be the case.

As can be seen from FIGS. 13 and 14, the two abutment elements 2 and 3 are limitedly moveable along the longitudinal axis 6 of the connecting element 1. In this case, the two abutment elements 2 and 3 project radially from the connecting element 1.

In the embodiment described hitherto, the connecting element 1 always had a thread 7 and 8 in order to screw the connecting element 1 into a furniture carcass side 108 or 109. It will be appreciated that this would not have to be the case. Thus, it is already known in furniture construction for such connecting elements also not to be screwed in, but instead these are often also connected to the furniture carcass side with a press fit.

In that case, the connecting element 1 can be of a thread-free configuration, as is the case in the two embodiments shown in FIGS. 15 through 18.

Figure 15:
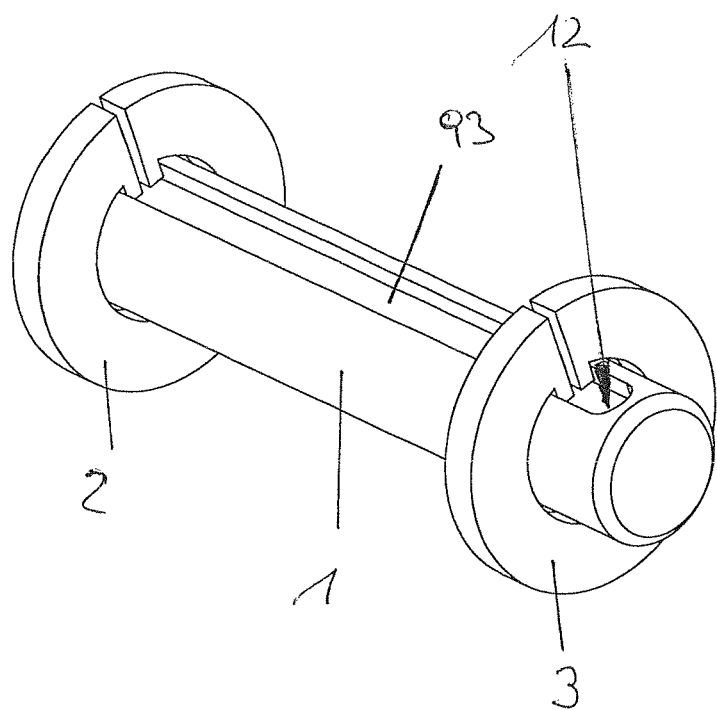
FIGS. 15 and 16 show a perspective view and a plan view of a variant of a connecting element with two abutment elements.
Figure 16:
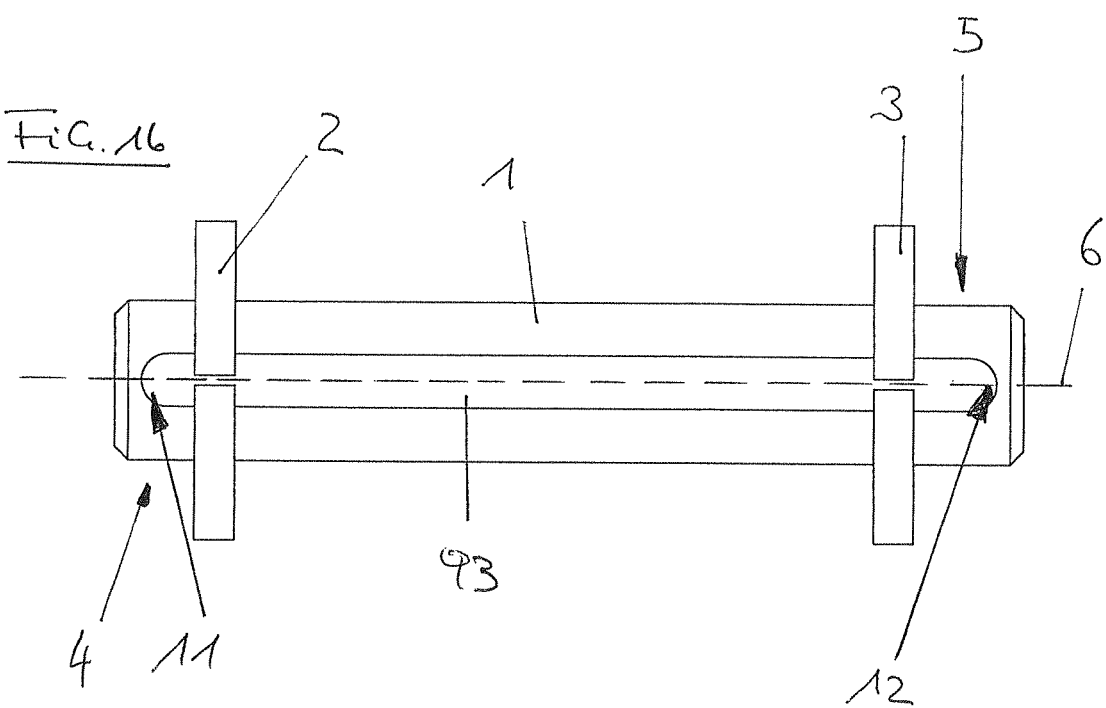

In FIGS. 15 and 16, the connecting element 1 is in the form of a pin having a groove 93 along its longitudinal axis 6. A nose of the abutment element 2 or 3 projects into that groove 93 in the connecting element 1. The abutment element 2 or 3 can slide or be pushed along the groove 93 until at the end of the groove 93 it bears against the abutments 11 and 12 thereof.

Figure 17:
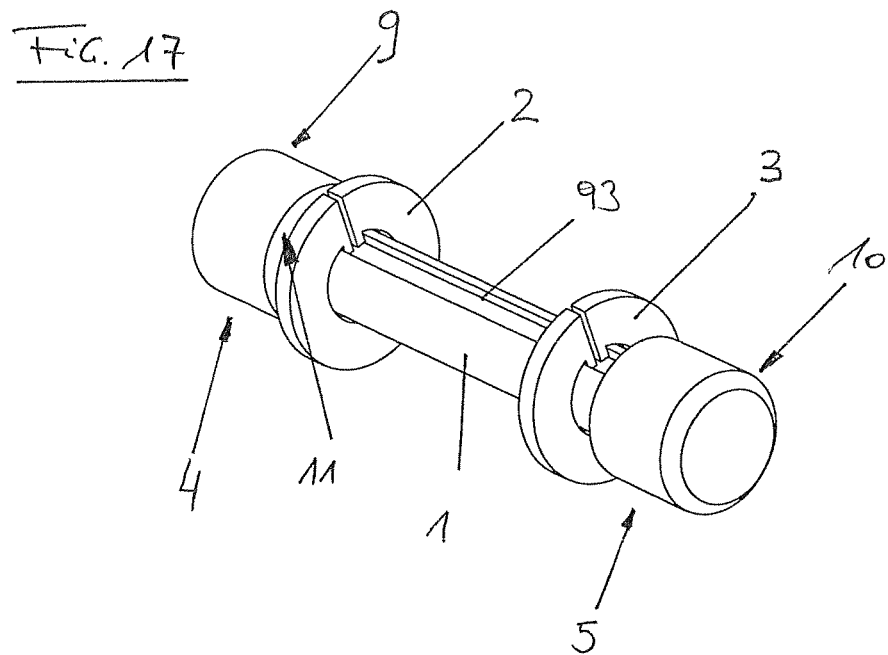
FIGS. 17 and 18 show a perspective view and a plan view of a further variant of a connecting element with two abutment elements.
Figure 18:
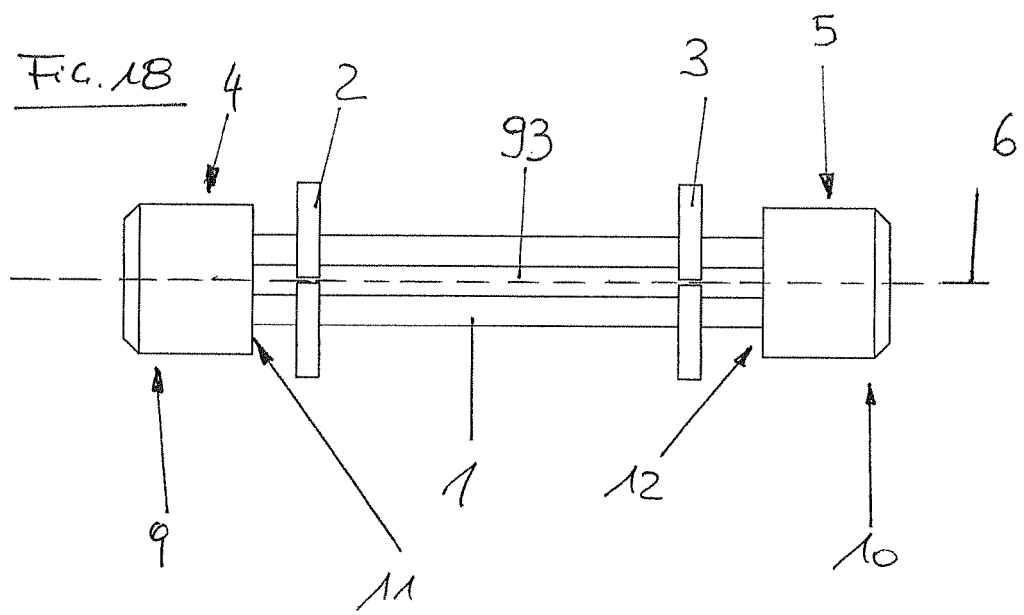

The situation is similar with the embodiment of FIGS. 17 and 18 in which the ends 9 and 10 of the connecting element 1 are of a larger diameter than the diameter of the connecting element 1 in its central region. Once again, the two abutment elements 2 and 3 are disposed between the two ends 9 and 10 of a larger diameter and can move freely between the abutments 11 and 12 in the region of the ends 9 and 10 of the connecting element 1. This embodiment also has a groove 93. That groove 93 however is only optional, a structure without that groove 93 can also be envisaged.

Neither the embodiment of FIGS. 15 and 16 nor the embodiment of FIGS. 17 and 18 has a thread for connecting the connecting element 1 to a furniture carcass side 108 or 109 (not shown here). The connection to the furniture carcass side is preferably effected by way of a press fit. For that purpose, it is also not necessary for the connecting element 1 to have a tool receiving means as the connecting element 1 can be driven into the furniture carcass side with a hammer or similarly suitable tool. However, this embodiment could also be provided with threads and/or tool receiving means.

Thus, in all embodiments, the connecting element regions 4 and 5 can be connected to the piece of furniture 110 (not shown here) in force-locking and/or positively locking relationship.

Otherwise, in the two embodiments of FIGS. 15 through 18, the foregoing description relating to the embodiments of FIGS. 4 through 14 correspondingly applies.

So that the connecting element 1 together with the abutment elements 2 and 3 is not disposed loosely in the through opening 21 in the securing body 20, there is provided a positioning device 60, as is shown in the embodiments of FIGS. 19 and 20.

In the FIG. 19 embodiment, the positioning device 60 engages into the thread 7 or 8 of the connecting element 1 and thus ensures that the connecting element 1 cannot move of its own accord in the through opening 21.

FIG. 20 shows a further embodiment in which the positioning device 60 has a spring device 61 which exerts a radial force on the connecting element 1 and thus also prevents the connecting element 1 from moving in the through opening 21.

In the embodiment in FIG. 20, the connecting element 1 also again has a thread 7 and 8 respectively. That would not be necessary for this embodiment of the positioning device 60 as the spring device 61 of the positioning device 60 would also press against a smooth shank of a connecting element 1 and would thus prevent movement thereof.

It will further be seen from FIGS. 19 and 20 that the two abutment elements 2, 3 of the securing device 100 are respectively limitedly moveable between one of the abutments 11, 12 which are fixed with respect to the connecting element, on one side, and the furniture fitting side 102, 103 serving as the abutment, on the other side.

The embodiments of FIGS. 4 through 20 each use two abutment elements 2 and 3 to secure a furniture fitting 101 to different furniture walls by way of the securing device 100 thereof.

Now the embodiment of FIGS. 21 through 25 uses a securing device 100 which has only a single abutment element 2 which is limitedly moveable relative to the connecting element 1 and by way of which the furniture fitting 101 can be secured to different furniture carcass sidewalls.

FIG. 21 shows an exploded view of a securing device 100 of a furniture fitting 101. In this case, unlike the preceding embodiments, the securing device 100 has only a single abutment element 2, wherein the abutment element 2 can be releasably secured to the connecting element 1.

The connecting element regions 4 and 5 of the connecting element 1 can again be connected to the piece of furniture (not shown here) in force-locking and/or positively locking relationship. In this embodiment also, the two connecting element regions 4 and 5 are of a mutually symmetrical configuration on the connecting element 1.

In this embodiment, the connecting element regions 4 and 5 are of a thread-less nature. It could, however, also be the case that the connecting element regions 4 and 5 have a thread with which the connecting element 1 is screwed into a piece of furniture.

It will be clearly apparent from this view that the abutment element 2 here is again in the form of a retaining ring. The connecting element 1 has the two abutments 11 and 12, which are fixed with respect to the connecting element, for the abutment element 2.

The abutment element 2 is limitedly moveable between those two abutments 11 and 12 and that abutment element 2 is also limitedly moveable between the furniture fitting sides 102 and 103 serving as the abutment. For that purpose, provided in the interior of the furniture fitting 102 is a cavity which receives the abutment element 2 therein in the mounted position (see in that respect FIGS. 22 through 25).

The abutments 11 and 12 which are fixed with respect to the connecting element are provided in the region of the two ends 9 and 10 of the connecting element 1, the abutment element 2 can bear against those abutments 11 and 12 in the mounting procedure.

In this embodiment, the connecting element 1 has two separate tool receiving means 13 and 14, being in the form of a cross slot in this embodiment. That is advantageous in particular when the connecting element 1 has a thread in order to connect the connecting element 1 to a furniture carcass wall. Also—as in this embodiment—the connecting element 1 may have no thread and can be connected to a furniture carcass sidewall by means of a press fit.

FIG. 22 shows a section through a furniture fitting 101 and its securing device 100 as a perspective view.

In this position, the securing device 100 is completely received in the furniture fitting 101 and does not project beyond the side walls 103 and 102 respectively of the furniture fitting. The interior of the furniture fitting 101 has a cavity in which the abutment element 2 is disposed.

When mounting the furniture fitting 101 to a left-hand side, the abutment element 2 bears against the left-hand furniture fitting inner abutment 22, while upon mounting to a right-hand side, the abutment element 2 would bear against the right-hand furniture fitting inner abutment 23.

It can be clearly seen from this view that the connecting element 1 and the securing body 20 are jointly in the form of a pre-assembled structural unit 50. It can further be clearly seen that the connecting element 1 extends substantially completely through the through opening 21 in the securing body 20. In this case, the abutment element 2 is mounted moveably in the two grooves 93. Naturally it would also be possible for there to be no groove 93, but instead a thread would be provided on the connecting element 1, on which the abutment element 2 could move.

FIG. 23 shows the furniture fitting 101 of FIG. 22 after the connecting element 1 has been displaced in the through opening 21 in the securing body 20 of the furniture fitting 101. In this case, the abutment element 2 has moved limitedly relative to the connecting element 1 as the abutment element 2 remains stopped in the cavity of the furniture fitting 101, while the connecting element 1 has moved partially out of the through opening 21.

FIG. 24 shows a side view illustrating how the furniture fitting 101 is arranged at the left-hand furniture carcass sidewall 109 so that the connecting element 1 is disposed in front of the bore 91 in the left-hand furniture carcass sidewall 109. Then, as shown in FIG. 25, the connecting element 1 is screwed into the bore 91 in the left-hand furniture carcass sidewall 109, more specifically until the abutment 12 of the connecting element 1, that is fixed with respect thereto, meets the abutment element 2 whereby the furniture fitting 101 is pressed against the left-hand furniture carcass sidewall 109 and is thus secured there.

It will be clearly seen from FIGS. 24 and 25 that the abutment element 2 projects radially from the connecting element 1 and that the connecting element 1 has a longitudinal axis 6, the abutment element 2 being limitedly moveable along that longitudinal axis 6 of the connecting element 1.

After mounting of the furniture fitting 101 has been effected, the connecting element 1 is received on one side sunk in the through opening 21 in the securing body 20 and on the other side in the piece of furniture 110—in this case, in the left-hand furniture carcass sidewall 109.

The invention claimed is:

1. A securing device for securing a furniture fitting to a piece of furniture, wherein the furniture fitting can be secured to the piece of furniture with the securing device selectively with a left-hand furniture fitting side or a right-hand furniture fitting side, the securing device comprising:
   a connecting element, wherein the connecting element has two connecting element regions for securing the furniture fitting to the piece of furniture, and
   a securing body having a through opening, wherein the securing body is adapted to be positioned in an interior of the furniture fitting between the left-hand furniture fitting side and the right-hand furniture fitting side, the connecting element is at least partly in the through opening, and the connecting element is moveable relative to the securing body,
   wherein the connecting element has at least one abutment element which is limitedly moveable relative to the connecting element,
   wherein the connecting element has two abutments fixed with respect to the connecting element, the two abutments being adapted such that one of the two abutments bears against the at least one abutment element in an assembly position, and
   wherein, in the assembly position, one of the two connecting element regions is adapted to project beyond the left-hand furniture fitting side or the right-hand furniture fitting side.

2. The securing device as set forth in claim 1, wherein the at least one abutment element projects radially from the connecting element.

3. The securing device as set forth in claim 1, wherein the connecting element has a longitudinal axis and the at least one abutment element is limitedly moveable along the longitudinal axis of the connecting element.

4. The securing device as set forth in claim 1, wherein the at least one abutment element can be releasably secured to the connecting element.

5. The securing device as set forth in claim 1, wherein the connecting element and the securing body jointly constitute a pre-assembled structural unit.

6. The securing device as set forth in claim 1, wherein the connecting element extends substantially completely through the through opening in the securing body.

7. The securing device as set forth in claim 1, wherein at least one of the two connecting element regions of the connecting element has a thread.

8. The securing device as set forth in claim 7, wherein the at least one abutment element is supported moveably in the thread.

9. The securing device as set forth in claim 1, wherein the at least one abutment element is a retaining ring.

10. The securing device as set forth in claim 1, wherein the at least one abutment element is respectively limitedly moveable between one of the two abutments which are fixed with respect to the connecting element on a first side and are adapted to be fixed with respect to one of the left-hand furniture fitting side and the right-hand furniture fitting side on a second side.

11. The securing device as set forth in claim 1, wherein the at least one abutment element includes two abutment elements.

12. The securing device as set forth in claim 1, wherein the connecting element has two ends, wherein a first of the two abutments is in a region of a first of the two ends of the connecting element and a second of the two abutments is in a region of a second of the two ends of the connecting element.

13. The securing device as set forth in claim 1, wherein the connecting element includes two separate tool receivers.

14. The securing device as set forth in claim 13, wherein the two separate tool receivers are slots, cross slots, hexagonal sockets, or hexalobular sockets.

15. The securing device as set forth in claim 1, wherein the two abutments which are fixed with respect to the connecting element have abutment surfaces which are oriented substantially perpendicularly to a longitudinal axis of the connecting element.

16. A furniture fitting for a piece of furniture, the furniture fitting comprising:
    at least one securing device for securing the furniture fitting to the piece of furniture, wherein the furniture fitting can be secured to the piece of furniture with the securing device selectively with a left-hand furniture fitting side or a right-hand furniture fitting side,
    wherein the at least one securing device comprises:
        a connecting element, wherein the connecting element has two connecting element regions for securing the furniture fitting to the piece of furniture, and
        a securing body having a through opening, wherein the securing body is positioned in an interior of the furniture fitting between the left-hand furniture fitting side and the right-hand furniture fitting side, the connecting element is at least partly in the through opening, and the connecting element is moveable relative to the securing body,
    wherein the connecting element has at least one abutment element which is limitedly moveable relative to the connecting element,
    wherein the connecting element has two abutments fixed with respect to the connecting element, the two abutments being adapted such that one of the two abutments bears against the at least one abutment element in an assembly position, and
    wherein, in the assembly position, one of the two connecting element regions projects beyond the left-hand furniture fitting side or the right-hand furniture fitting side.

17. The furniture fitting as set forth in claim 16, wherein the securing body is substantially completely in the furniture fitting.

18. The furniture fitting as set forth in claim 16, wherein the furniture fitting is an ejection device, a drive device, a retraction device or a damping device for a moveable furniture part or an actuating drive for a furniture flap or a rail extension guide or a lighting device.

19. A piece of furniture comprising:
    a furniture carcass;
    a furniture fitting secured to the furniture carcass; and
    a moveable furniture part secured to the furniture fitting,
    wherein the furniture fitting has:
        at least one securing device for securing the furniture fitting to the furniture carcass, wherein the furniture fitting can be secured to the furniture carcass with the at least one securing device selectively with a left-hand furniture fitting side or a right-hand furniture fitting side,
    wherein the at least one securing device comprises:
        a connecting element, wherein the connecting element has two connecting element regions for securing the furniture fitting to the furniture carcass, and
        a securing body having a through opening, wherein the securing body is positioned in an interior of the furniture fitting between the left-hand furniture fitting side and the right-hand furniture fitting side, the connecting element is at least partly in the through opening and the connecting element is moveable relative to the securing body,
    wherein the connecting element has at least one abutment element which is limitedly moveable relative to the connecting element,
    wherein the connecting element has two abutments fixed with respect to the connecting element, the two abutments being adapted such that one of the two abutments bears against the at least one abutment element in an assembly position, and
    wherein, in the assembly position, one of the two connecting element regions projects beyond the left-hand furniture fitting side or the right-hand furniture fitting side.

20. The piece of furniture as set forth in claim 19, wherein, in the assembly position, a first side of the connecting element is sunk in the through opening of the securing body and a second side of the connecting element is sunk in the piece of furniture.

* * * * *